United States Patent
Yamamoto et al.

(10) Patent No.: US 7,713,908 B2
(45) Date of Patent: May 11, 2010

(54) POROUS COMPOSITE METAL OXIDE AND METHOD OF PRODUCING THE SAME

(75) Inventors: Toshio Yamamoto, Nishikamo-gun (JP); Akihiko Suda, Seto (JP); Akira Morikawa, Nagoya (JP); Kae Yamamura, Nagoya (JP); Hirotaka Yonekura, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 1259 days.

(21) Appl. No.: 11/212,724

(22) Filed: Aug. 29, 2005

(65) Prior Publication Data

US 2006/0043651 A1 Mar. 2, 2006

(30) Foreign Application Priority Data

Aug. 30, 2004 (JP) ............................ 2004-249452

(51) Int. Cl.
*B01J 23/00* (2006.01)
*B01J 21/00* (2006.01)
*B01J 20/00* (2006.01)

(52) U.S. Cl. .................. 502/300; 502/104; 502/301; 502/302; 502/303; 502/304; 502/305; 502/306; 502/307; 502/308; 502/309; 502/310; 502/311; 502/312; 502/313; 502/314; 502/315; 502/316; 502/317; 502/318; 502/319; 502/320; 502/321; 502/322; 502/323; 502/324; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/352; 502/353; 502/354; 502/355; 502/415; 502/439

(58) Field of Classification Search ................ 502/104, 502/300–355, 415, 439, 240
See application file for complete search history.

(56) References Cited

U.S. PATENT DOCUMENTS

| | | | | |
|---|---|---|---|---|
| 5,215,943 A | * | 6/1993 | Anderson et al. | 501/12 |
| 5,227,342 A | * | 7/1993 | Anderson et al. | 501/12 |
| 5,552,351 A | * | 9/1996 | Anderson et al. | 501/81 |
| 6,284,819 B1 | * | 9/2001 | Darsillo et al. | 524/22 |
| 6,365,264 B2 | * | 4/2002 | Darsillo et al. | 428/32.34 |

(Continued)

FOREIGN PATENT DOCUMENTS

JP  6-199582  7/1994

(Continued)

*Primary Examiner*—Cam N Nguyen
(74) *Attorney, Agent, or Firm*—Oblon, Spivak, McClelland, Maier & Neustadt, L.L.P.

(57) ABSTRACT

A method of producing a porous composite metal oxide comprising the steps of: dispersing first metal oxide powder, which is an aggregate of primary particles each with a diameter of not larger than 50 nm, in a dispersion medium by use of microbeads each with a diameter of not larger than 150 μm, thus obtaining first metal oxide particles, which are 1 nm to 50 nm in average particle diameter, and not less than 80% by mass of which are not larger than 75 nm in diameter; dispersing and mixing up, in a dispersion medium, the first metal oxide particles and second metal oxide powder, which is an aggregate of primary particles each with a diameter of not larger than 50 nm, and which is not larger than 200 nm in average particle diameter, thus obtaining a homogeneously-dispersed solution in which the first metal oxide particles and second metal oxide particles are homogeneously dispersed; and drying the homogeneously-dispersed solution, thus obtaining a porous composite metal oxide.

16 Claims, 1 Drawing Sheet

U.S. PATENT DOCUMENTS

| | | | |
|---|---|---|---|
| 6,667,012 B1 * | 12/2003 | Anand et al. | 422/177 |
| 6,846,410 B2 * | 1/2005 | McNeff et al. | 210/198.2 |
| 6,926,875 B2 * | 8/2005 | Hatanaka et al. | 423/239.1 |
| 6,929,970 B2 * | 8/2005 | Andriessen et al. | 438/57 |
| 7,001,866 B2 * | 2/2006 | Wang et al. | 502/242 |
| 7,214,643 B2 * | 5/2007 | Yamamoto et al. | 502/300 |
| 7,314,846 B2 * | 1/2008 | Kuno | 502/326 |
| 2003/0211815 A1 * | 11/2003 | Carter et al. | 451/41 |

FOREIGN PATENT DOCUMENTS

| | | |
|---|---|---|
| JP | 7-284672 | 10/1995 |
| JP | 10-249198 | 9/1998 |
| JP | 2003-170055 | 6/2003 |

\* cited by examiner

POROUS COMPOSITE METAL OXIDE AND METHOD OF PRODUCING THE SAME

BACKGROUND OF THE INVENTION

1. Field of the Invention

The present invention relates to a porous composite metal oxide and a method of producing the same. More specifically, the present invention relates to a porous composite metal oxide, which is useful as an exhaust gas cleaning catalyst and the like for cleaning exhaust gas of HC, $NO_x$, CO and the like, and to a method of producing the same.

2. Related Background Art

Presence of noxious gases, which are components capable of being present in environments surrounding the humans, and which are likely to affect the human bodies, have been drawing attention as problems in recent years. Development of an exhaust gas cleaning catalyst has been awaited, which can surely clean exhaust gas, for example, of its noxious components, including HC, $NO_x$, CO and the like.

Against such a background, catalysts of various types for cleaning the exhaust gas have been developed. Methods of producing a porous body which has a large specific surface area even at a high temperature exceeding 1,200° C. have been described in Japanese Patent Application Laid-open Gazettes No. Hei. 6-199582 (hereinafter referred to as "Literature 1") and No. Hei. 7-284672 (hereinafter referred to as "Literature 2"). In the case of Literature 1, alumina particles each with an average particle diameter of 10 nm to 100 nm, silica particles each with an average particle diameter of less than 50 nm, and the like are mixed up with one another. In the case of Literature 2, alumina particles, not less than 50 percent by mass of which have a particle diameter of not more than 100 nm, silica particles, not less than 50 percent by mass of which have a particle diameter of not more than 100 nm, and the like are mixed up with one another. In addition, Japanese Patent Application Laid-open Gazette No. Hei. 10-249198 (hereinafter referred to as "Literature 3") has provided descriptions for a method of producing an exhaust gas cleaning catalyst. The catalyst realizes good durability of cleaning activity by mixing up ultra-fine particles, which bear a noble metal and which are 1 nm to 100 nm in average particle diameter, with other particles.

Nowadays, however, increasingly strict restrictions have been imposed on the noxious components in the exhaust gas. In this situation, exhaust gas cleaning catalysts need to meet more and more strict requirements for catalysts to be capable of surely cleaning such noxious components. Consequently, development of an exhaust gas cleaning catalyst has been awaited, which realizes a better durability against high-temperature, in other words, which can maintain a specific surface area and cleaning performance at a higher level even after a high-temperature durability test.

SUMMARY OF THE INVENTION

The present invention has been made with the problems with the conventional techniques taken into consideration. An object of the present invention is to provide a porous composite metal oxide, which is very good at durability against high-temperature, and can maintain a specific surface area and cleaning performance at a high level even after a high-temperature durability test. In addition, the porous composite metal oxide is useful as an exhaust gas cleaning catalyst and the like. In addition, the object of the present invention is to provide a method of being capable of producing such a porous composite metal oxide.

The present inventors have enthusiastically carried out studies for the purpose of achieving the aforementioned object. As a consequence, the present inventors have found that the object can be achieved by dispersing first metal oxide particles, which have been dispersed by use of fine microbeads each with a diameter of not more than 150 μm, and second metal oxide particles each with an average particle diameter of not more than 200 nm, and by mixing up the first and the second metal oxide particles with each other. Accordingly, the present inventors have completed the present invention.

A method of producing a porous composite metal oxide of the present invention, includes:

a dispersing step of dispersing first metal oxide powder, which is an aggregate of primary particles each with a diameter of not larger than 50 nm (advantageously, not larger than 20 nm), in a dispersion medium by use of microbeads each with a diameter of not larger than 150 μm (advantageously, 10 μm to 100 μm), thus obtaining first metal oxide particles, which are 1 nm to 50 nm in average particle diameter, and not less than 80 percent by mass of which are not larger than 75 nm in diameter;

a dispersing-mixing step of dispersing and mixing up, in a dispersion medium, the first metal oxide particles and second metal oxide powder, which is an aggregate of primary particles each with a diameter of not larger than 50 nm (advantageously, not larger than 20 nm), and which is not larger than 200 nm in average diameter, thus obtaining a homogeneously-dispersed solution in which the first metal oxide particles and second metal oxide particles are homogeneously dispersed; and a drying step of drying the homogeneously-dispersed solution, thus obtaining a porous composite metal oxide.

In addition, the porous composite metal oxide of the present invention is characterized by being obtained by use of the method of the present invention which has been described above.

It is advantageous that the first metal oxide according to the present invention be an oxygen storage material made of a metal oxide having an oxygen storage capacity (OSC), and that the second metal oxide according to the present invention be a diffusion barrier material made of a metal oxide which becames a diffusion barrier.

In the case of the method of producing the porous composite metal oxide of the present invention, it is advantageous that the pH of the dispersing medium to be used in the dispersing step be a pH in a range which makes the zeta potential of the first metal oxide not smaller than 20 mV in absolute value. In addition, it is advantageous that the pH of the dispersing medium to be used in the dispersing-mixing step be a pH in a range which causes one of the zeta potential of the first metal oxide and the zeta potential of the second metal oxide to be a positive potential, and which causes the other to be a negative potential.

Furtherlarger, in the case of the method of producing the porous composite metal oxide according to the present invention, it is advantageous that the second metal oxide particles to be obtained in the dispersing-mixing step be 1 nm to 130 nm in average particle diameter, and that not less than 80 percent by mass of the second metal oxide particles be not larger than 160 nm in diameter.

Largerover, it is advantageous that, in the dispersing-mixing step, the first metal oxide particles and the second metal oxide powder be dispersed, and be mixed up with each other, in the dispersing medium by use of microbeads each with a diameter of not larger than 150 μm (more advantageously, 10 μm to 100 μm).

Additionally, in the case of the production method of the present invention, the dispersing-mixing step does not have to be performed after the dispersing step. The dispersing step and the dispersing-mixing step may be performed by use of microbeads each with a diameter of not larger than 150 μm in a single step.

As well, in the case of the method of producing the porous composite metal oxide of the present invention, it is advantageous that a bearing step of causing a noble metal to be borne on the surface of each of particles of at least one kind of the first metal oxide particles and the second metal oxide particles be further included.

Further, it is advantageous that a surfactant be added to, and be mixed with, the homogeneously-dispersed solution, and that the homogeneously-dispersed solution be thereafter dried by means of a heat dry process in the drying step.

It should be noted that a reason why the production method according to the present invention makes it possible to obtain the porous composite metal oxide which is very good at durability against high temperature has not yet been known exactly. However, the present inventors presume the reason to be as follows. Specifically, the first metal oxide particles, which have been dispersed by use of the fine microbeads each with a diameter of not larger than 150 μm, and the second metal oxide particles each with an average particle diameter of not larger than 200 nm are dispersed, and are mixed up with each other. This makes both the first and the second metal oxide particles mixed homogeneously at a nano level. Accordingly, the first and the second metal oxide particles take a form in which the same type of metal oxide particles have the other type of metal oxide particles present, as barriers, among themselves. This fully inhibits particle growth of each of the first and the second metal oxide particles during the drying step and processes to be performed at a high temperature. As a consequence, the specific surface area and the cleaning performance are maintained at a high level even after a high-temperature durability test.

The present invention makes it possible to produce the porous composite metal oxide, which is very good at the durability against high temperature, which maintains the specific surface area and the cleaning performance at a high level even after a high-temperature durability test, and which is useful as an exhaust gas cleaning catalyst and the like.

DETAILED DESCRIPTION OF THE PREFERRED EMBODIMENTS

Figure 1:
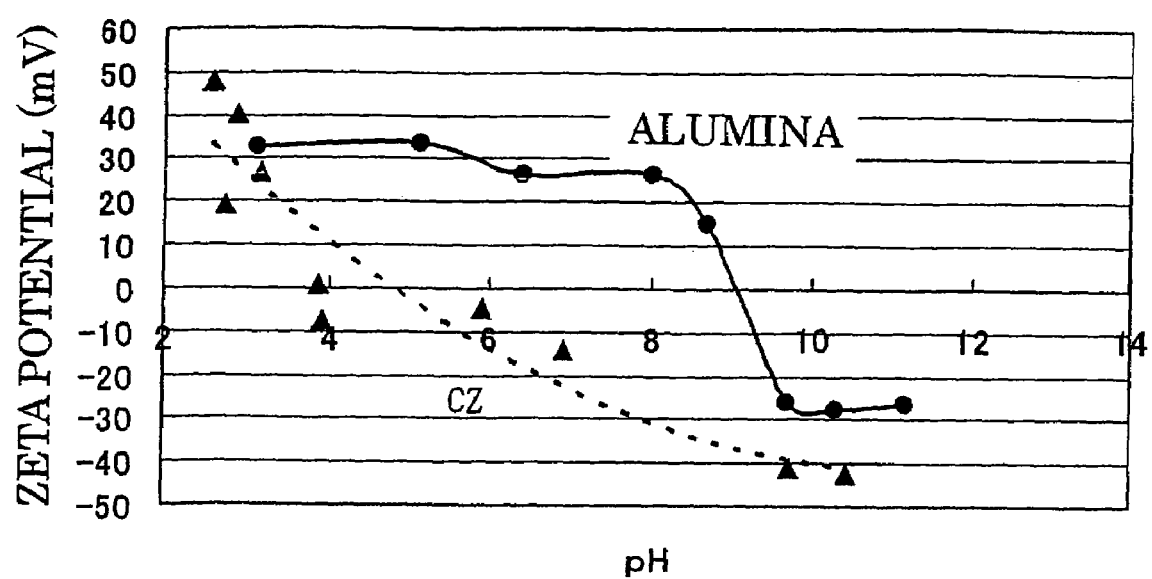
FIG. 1 is a graph showing zeta potentials respectively of ceria-zirconia composite oxide (CZ) and alumina.

Hereinafter, detailed descriptions will be provided for the present invention giving its preferred embodiments. The method of producing the porous composite metal oxide of the present invention includes:

(i) a dispersing step of dispersing first metal oxide powder, which is an aggregate of primary particles with a diameter of not more than 50 nm, in a dispersion medium by use of microbeads with a diameter of not more than 150 μm, thus obtaining first metal oxide particles, which are 1 nm to 50 nm in average particle diameter, and not less than 80 percent by mass of which are not more than 75 nm in diameter;

(ii) a dispersing-mixing step of dispersing the first metal oxide particles and second metal oxide powder, which is an aggregate of primary particles each with a diameter of not more than 50 nm, and which is not more than 200 nm in average particle diameter, and mixing the first metal oxide particles and the second metal oxide powder with each other, in a dispersing medium, thus obtaining a homogeneously-dispersed solution in which the first metal oxide particles and second metal oxide particles are homogeneously dispersed; and (iii) a drying step of drying the homogeneously-dispersed solution, thereby obtaining a porous composite metal oxide.

No specific restriction is imposed on the type of the first metal oxide and the second metal oxide which are to be used in the case of the present invention. Oxides which are made of at least one metal selected from the group consisting of base metal elements (Y, La, Ce, Pr, Nd, Eu, Gd, Tb, Dy, Ho, Er, Tm, Yb, Lu, Ca, Mg, Al, K, Ti, Cr, Mn, Fe, Co, Ni, Cu Ga, Rb, Sr, Zr, Nb, Mo, In, Sn, Cs, Ba, Ta, W and the like), noble metal elements (Pt, Pd, Rh, Ru, Au, Ag, Os, and Ir) and metalloid elements (Si, Ge, As, Sb and the like) can be listed for the first metal oxide and the second metal oxide. It is advantageous that any one of a single oxide and a composite oxide which are made of at least one metal selected from a group consisting of Ce, Zr, Al, Ti, Si, Mg, Fe, Mn, Ni, Zn and Cu be used for the first metal oxide and the second metal oxide. It is more advantageous that at least one type selected from a group consisting of ceria, zirconia, ceria-zirconia composite oxide (solid solution), alumina, titania, sepiolite and zeolite be used for the first metal oxide and the second metal oxide. Incidentally, the metals according to the present invention include metalloids (semi-metals). In addition, the metal oxides according to the present invention may contain a plurality of metal elements in common with ceria-zirconia composite oxide, sepiolite and zeolite.

In addition, no specific restriction is also imposed on a combination of the first metal oxide and the second metal oxide which are to be used in the case of the present invention. The combination of the first metal oxide and the second metal oxide can be selected depending on intended use and the like of an object porous composite metal oxide whenever deemed necessary. For example, in a case where a porous composite metal oxide to be useful as an exhaust gas cleaning catalyst is intended to be obtained, it is advantageous that a combination of an oxygen storage material and a diffusion barrier material be the combination of the first metal oxide and the second metal oxide to be used in the case of the present invention. The oxygen storage material includes ceria, ceria-zirconia composite oxide (solid solution), iron oxide, praseodymium oxide or the like, all of which have an oxygen storage capacity (OSC). The diffusion barrier material includes alumina, zirconia, titania or the like, all of which can constitute a diffusion barrier. Furthermore, it is more advantageous that combinations of ceria-zirconia composite oxide and alumina, ceria and alumina, zirconia and alumina, ceria and titania, alumina and titania, alumina and silica, and the like be the combination of the first metal oxide and the second metal oxide from the viewpoint of a combination of oxides which can surely constitute diffusion barriers against each other, for example, even after a high-temperature process is applied to the oxides.

The first metal oxide to be used in the case of the present invention of this kind needs to be powder made of aggregates of primary particles (crystallites) which are not more than 50 nm (more advantageously, not more than 20 nm; and particularly advantageously, 2 nm to 10 nm) in diameter. In a case where the primary particles are more than 50 nm in diameter, fully minute nanosized particles can not be obtained even if the particles are dispersed by use of the below-mentioned microbeads. As a result, this makes it impossible to obtain a porous composite metal oxide which is sufficiently good at durability against high temperature. As well, no restriction is imposed on the average particle diameter of the first metal oxide powder to be used in the case of the present invention. However, it is advantageous that the average particle diameter be not more than 200 nm, and it is more advantageous that the average diameter be not more than 100 nm, from the viewpoint of making it possible to obtain nanosized particles efficiently.

Moreover, the second metal oxide to be used in the case of the present invention also needs to be powder made of aggregates of primary particles (crystallites) which are not more than 50 nm (more advantageously, not more than 20 nm; and particularly advantageously, 2 nm to 10 nm) in diameter. In a case where the primary particles are more than 50 nm in diameter, fully minute nanosized particles can not be obtained even if the particles are dispersed by use of the below-mentioned microbeads. As a result, this makes it impossible to obtain a porous composite metal oxide which is sufficiently good at durability against high temperature. As well, the average particle diameter of the second metal oxide powder to be used in the case of the present invention needs to be not more than 200 nm. It is advantageous that the average particle diameter be 10 nm to 100 nm. In a case where the second metal oxide powder is more than 200 nm in average particle diameter, a homogeneously-mixed condition at a nano level can not be realized even if the second metal oxide powder and the first metal oxide particles are dispersed, and are mixed up with each other. As a consequence, this makes it impossible to obtain a porous composite metal oxide which is sufficiently good at durability against high temperature.

It should be noted that no specific restriction is imposed on the method of producing the first metal oxide powder and the second metal oxide powder. The first metal oxide powder and the second metal oxide powder can be obtained by means of a precipitation process using a solution of a metallic salt which is a raw material for the first metal oxide powder and the second metal oxide powder, and by means of calcining a precipitate to be obtained by means of the precipitation process, whenever deemed necessary.

The microbeads to be used in the dispersing step in the case of the present invention need to be not more than 150 μm in diameter. It is advantageous that the microbeads be 10 μm to 100 μm in diameter. It is particularly advantageous that the microbeads be 15 μm to 50 μm in diameter. In a case where the macrobeads are more than 150 μm in diameter, neither fully minute nanosized particles nor the homogeneously-dispersed condition at a nano level can be realized. As a result, this makes it impossible to obtain the porous composite metal oxide which is sufficiently good at durability against high temperature. Moreover, in a case where the microbeads are more than 150 μm in diameter, this causes the composition of the particles per se to be deformed, and causes their crystals to be destroyed. From this viewpoint, no sufficient thermal resistance can be obtained.

In addition, it is advantageous that the diameter of each of the microbeads to be used in the dispersing step be 250 to 1,000 times as large as the average particle diameter of the first metal oxide powder. In a case where the diameter of each of the microbeads is smaller than the aforementioned lower limit, this exhibits a tendency towards a deteriorated efficiency in the dispersion. On the other hand, in a case where the diameter of each of the microbeads exceeds the aforementioned upper limit, this exhibits a tendency for sufficiently minute nanosized particles to be hard to obtain.

Moreover, it is advantageous that, in the dispersing-mixing step according to the present invention, the first metal oxide particles and the second metal oxide powder be dispersed, and be mixed with each other, in the dispersion medium by use of the same microbeads as are used in the dispersing step.

Furthermore, no specific restriction is imposed on the material for the microbeads to be used in the case of the present invention. For example, zirconia, glass and the like can be listed as the material for the microbeads. It is advantageous that the material for such microbeads be selected depending on the first and/or the second metal oxides to be used, whenever deemed necessary.

The dispersion medium to be used in the dispersing step and in the dispersing-mixing step in the case of the present invention may be a liquid which can disperse the first metal oxide particles to be obtained and the second metal oxide particles to be obtained. No specific restriction is imposed on the dispersion medium. It is advantageous that water and the like be used. No other substance specifically has to be added to such dispersion medium. As described below, however, in a case where the pH of the dispersion medium is intended to be adjusted, an acid, including acetic acid, a base, including ammonia, a buffer agent and the like may be added to the dispersion medium for the intended purpose whenever deemed necessary.

A specific apparatus to be used in the dispersing step and in the dispersing-mixing step may be that which can meet the following requirements. First, the apparatus is required to be capable of mixing the first metal oxide powder along with the microbeads in the aforementioned dispersion medium, and thereby to be capable of obtaining the first metal oxide particles, which will be described later. Second, the apparatus is required to be capable of mixing the first metal oxide particles and the second metal oxide powder in the same dispersion medium, and thereby to be capable of obtaining the solution in which the first metal oxide particles and the second metal oxide particles are homogeneously dispersed, which solution will be described later. Except for these requirements, no specific restriction is imposed on the apparatus. If a "Ultra Apex Mill" made by Kotobuki Industries Co., Ltd. is used, for example, this makes it possible to efficiently separate the particles and the microbeads from each other by means of the centrifugal force generated by the mill.

In the case of the present invention, first of all, the first metal oxide powder is dispersed in the dispersion medium by use of the microbeads, and thereby the first metal oxide particles, which are sufficiently minute microsized, are obtained (in the dispersing step). The first metal oxide particles are 1 nm to 50 nm in average particle diameter (more advantageously, 1 nm to 30 nm). Not less than 80% by mass of the particles are not larger than 75 nm in diameter (it is more advantageous that not less than 80% by mass of the particles be not larger than 50 nm in diameter). The homogeneously-mixed condition at the nano level can not be realized in the dispersing-mixing step, which will be described later, in the following two cases. The first is a case where the first metal oxide particles to be obtained are larger than 50 nm in average particle diameter. The second is a case where particles with a diameter of not more than 75 nm exist in a ratio of less than 80% by mass. As a consequence, this makes it impossible to obtain the porous composite metal oxide which is sufficiently good at durability against high temperature.

No specific restriction is imposed on conditions in which the dispersing process is performed in such a dispersing step. In a usual case, a temperature in a range of room temperature to approximately 80° C. and a processing time in a range of 20 minutes to 200 minutes are adopted as the conditions.

Additionally, in such dispersing step, it is advantageous that the pH of the dispersion medium be a pH in a range which makes the zeta potential of the first metal oxide not smaller than 20 [mV] in absolute value. In a case where the zeta potential of the first metal oxide is smaller than 20 [mV] in absolute value, this makes it likely that the first metal oxide particles will be flocculated again, and accordingly be segregated. This exhibits a tendency for the sufficiently minute nanosized particles to be hard to obtain. For example, the zeta potentials respectively of ceria-zirconia composite oxide and alumina are shown in FIG. 1. In a case where ceria-zirconia composite oxide is intended to be used as the first metal oxide, it is advantageous that the pH of the dispersed medium in the dispersing step be not more than 3.5 or not less than 7.

In the case of the present invention, subsequently to the dispersing step, the first metal oxide particles and the second metal oxide powder, which have been obtained in the dispersing step, are dispersed, and are mixed with each other, in the dispersion medium. Thereby, the homogeneously-mixed solution, in which the first metal oxide particles and the second metal oxide particles are in a condition of being homogeneously mixed at the nano level, is obtained (in the dispersing-mixing step). In this respect, it is advantageous that the second metal oxide particles to be obtained be 1 nm to 130 nm in average particle diameter. In addition, it is advantageous that not less than 80% by mass of the particles be not larger than 160 nm in diameter. The sufficiently homogeneously-mixed condition at the nano level is hard to realize in the following two cases. The first is a case where the second metal oxide particles to be obtained is larger than 130 nm in average particle diameter. The second is a case where particles with a diameter of not larger than 160 nm exist in a ratio of less than 80% by mass. In these cases, the porous composite metal oxide to be obtained has a tendency towards deteriorated durability against high temperature.

No specific restriction is imposed on conditions in which the dispersing-mixing process is performed in such a dispersing-mixing step. In a usual case, a temperature in a range of room temperature to approximately 80° C. and a processing time in a range of 10 minutes to 100 minutes are adopted as the conditions.

Moreover, it is advantageous that, in such dispersing-mixing step, the pH of the dispersion medium is a pH in a range which causes one of the zeta potential of the first metal oxide and the zeta potential of the second metal oxide to be a positive potential, and which causes the other to be a negative potential. It is advantageous that the pH of the dispersion medium be a pH in a range which makes the difference between the two metal oxides larger than 10 mV. In a case where the zeta potential of the first metal oxide and the zeta potential of the second metal oxide are positive potentials at a time, or negative potentials at a time, this makes it likely that the first metal oxide particles to be obtained and the second metal oxide particles to be obtained will be flocculated, and accordingly be segregated. Hence, the porous composite metal oxide to be obtained has a tendency towards deteriorated durability against high temperature. As clear from the zeta potentials respectively of ceria-zirconia composite oxide (CZ) and alumina shown in FIG. 1, it is advantageous that the pH of the dispersion medium in the dispersing-mixing step be 5 to 9, in a case where ceria-zirconia composite oxide (CZ) and alumina are intended to be used respectively as the first and the second metal oxides.

As well, no specific restriction is imposed on the mixing ratio (mass ratio) between the first and the second metal oxides which are to be mixed in the dispersing-mixing step. However, it is advantageous that the ratio of the mass of the first metal oxide to the mass of the second metal oxide be 1:10 to 5:1. In a case where the mixing ratio of the first metal oxide to the second metal oxide is smaller than the aforementioned lower limit, the first metal oxide has a tendency towards a smaller effect of the first metal oxide of being mixed with the particles. On the other hand, in a case where the mixing ratio of the second metal oxide to the first metal oxide is less than the aforementioned lower limit, this exhibits a tendency for the first metal oxide to be easy to flocculate again. Further, in a case where the second metal oxide is used as the diffusion barrier, the second metal oxide has a tendency towards a deteriorated effect as the diffusion barrier.

Furthermore, in the case of the producing method of the present invention, the dispersing-mixing step does not have to be performed before the dispersing step. The dispersing step and the dispersing-mixing step may be performed by use of microbeads with a diameter of not more than 150 μm in a single step. It should be noted that, in this case, it is advantageous that there be no large difference in particle diameter between the first metal oxide and the second metal oxide. In addition, it is advantageous that the metal oxide of one kind be one time to five times as large in average diameter as the metal oxide of the other kind. Additionally, in this case, the efficiency of the dispersion tends to be deteriorated depending on the pH of the dispersion medium. For this reason, it is advantageous that the pH of the dispersion medium be a pH in a range which causes the absolute values of the zeta potentials respectively of the first metal oxide and the second metal oxide to be not smaller than 10 [mV].

In the case of the present invention, subsequently to the dispersing-mixing step, the solution in which the first metal oxide particles and the second metal oxide particles are homogeneously-dispersed, and which has been obtained in the dispersing-mixing step, is dried, and thereby the porous composite metal oxide (in the drying step) is obtained. No specific restriction is imposed on conditions for the drying process in which such a homogeneously-dispersed solution is dried. One of the following drying methods is adopted depending on the necessity. The drying methods includes: a normal-temperature or heated drying method of drying the homogeneously-dispersed solution at a temperature of 80° C. to 400° C. for a time of one to twenty-four hours; and a freeze-drying method of freezing the homogeneously-dispersed solution to a temperature below zero ° C. by use of liquid nitrogen, and thereafter drying the solution under reduced pressure.

In the case of the present invention, moreover, in the drying step, it is advantageous that a surfactant be added to, and mixed with, the homogeneously-dispersed solution, and that thereafter the solution with the surfactant added be dried by heating, as described in detail below. The adoption of such a drying method makes it possible to obtain the multilayered porous composite metal oxide, and to control the form of the multiple layers by means of the kind of surfactant. As well, if the surfactant is added to the homogeneously-dispersed solution, the addition leads to the coating of the secondary particles with the surfactant, accordingly inhibiting the secondary particles from being flocculated with one another. Furthermore, as the consequence of the dispersing effect of the surfactant, the secondary particles to be obtained by means of flocculation of the surfactant have a tendency towards an improved dispersibility. These effects tend to improve efficiency in obtaining the porous composite metal oxide with a desired center fine pore diameter (advantageously, of 5 nm to 30 nm) and with a desired fine pore volume (advantageously, of not smaller than 0.2 cc/g), and additionally to improve the durability of the porous composite metal oxide against high temperature.

Any one of anionic, cationic and nonionic surfactants can be adopted for the surfactant to be used in such a drying step.

However, it is advantageous that the surfactant to be used therein be a surfactant which can easily form micelles each with a narrow space built up inside, for example, spherical micelles. In addition, it is advantageous that the surfactant to be used therein be a surfactant which has the critical concentration for micelle formation of not higher than 0.1 mol/liter. It is more advantageous that the surfactant to be used therein be a surfactant which has the critical concentration for micelle formation of not higher than 0.01 mol/liter. Incidentally, a critical concentration for micelle formation means the lowest concentration at which a surfactant forms micelles.

At least one kind selected from the following list can be used for the surfactant to be used therein.

(i) Anionic Surfactants:

alkylbenzene sulfonic acids and alkylbenzene sulfonates, alpha-olefin sulfonic acids and alpha-olefin sulfonates, alkyl-sulfates, alkyl ether sulfates, phenyl ether sulfates, methyl taurides, sulfo-succinates, ether sulfates, alkyl sulfates, ether sulfonates, saturated fatty acids and saturated fatty acid salts, unsaturated fatty acids and unsaturated fatty acid salts of oleic acids and the like, derivatives of carboxylic acids, sulfonic acids, sulfuric acids and phosphoric acids, phenols as well as the like (ii) Nonionic Surfactants:

polyoxyethylene-polypropylene alkyl ether, polyoxyethylene alkyl ether, polyoxyethylene alkyl phenyl ether, polyoxyethylene polystylyl phenyl ether, polyoxyethylene-polyoxy polypropylene alkyl ether, polyoxyethylene-polyoxy propylene glycols, polyhydric alcohols (glycols, glycerins, solbitols, mannitols, pentaerythritols, sucroses and the like), fatty acid partial esters of polyhydric alcohols, polyoxyethylene fatty acid partial esters of polyhydric alcohols, polyoxyethylene fatty acid esters of polyhydric alcohols, polyoxyethylene hydrogenerated caster oil, polyglycerol fatty acid esters, fatty acid diethanolamides, polyoxyethylene alkyl amines, triethanolamine fatty acid partial esters, trialkylamine oxides, and the like (iii) Cationic Surfactants:

fatty acid primary amine salts, fatty acid secondary amine salts, fatty acid tertiary amine salts, tetraalkylammonium salts, trialkylbenzyl ammonium salts, alkylpyridinium salt, 2-alkyk-1-alkyk-hydroxyethyl imidazolinium salts, N,N-dialkylmorpholinium salts, polyethylene polyamines, quaternary ammonium acids of fatty acid amide salts and the like, as well as the like (iv) Amphoteric Surfactants:

betaine comppunds and the like

No specific restriction is imposed on the amount of such a surfactant to be added. However, it is advantageous that the amount of the surfactant to be added relative to the porous composite metal oxide be in a range of 2% by mass to 40% by mass, or that a mass ratio of the porous composite metal oxide to the surfactant be in a range of between 98 and 60 to between 2 and 40. In a case where the amount of the surfactant to be added is smaller than 2% by mass, this addition makes the effect of the addition smaller. In a case where more than 40% by mass of the surfactant is added, this addition deteriorates the dispersibility of the secondary particles to be obtained by means of flocculation of the surfactant. In addition, the calorific value stemming from combustion of the surfactant is larger while the surfactant is being dried by heating. For this reason, the metal oxides are flocculated. Accordingly, each of the metal oxides has a tendency towards a decreased specific surface area.

It is advantageous that the agitation speed in the drying step be higher than 200 $sec^{-1}$, and that the agitation be performed at the speed, at a temperature of 10° C. to 30° C., for not less than 5 minutes. In a case where a shearing force stemming from the agitation is too large, this evolves heat, and the machine is ablated to a larger extent. On the other hand, in a case where the shearing force is too small, the surfactant has tendency towards an insufficient dispersiveness. Moreover, in a case where the temperature during the agitation is lower than the aforementioned range, it takes a longer time to perform the agitation. By contrast, in a case where the temperature during the agitation is higher than the aforementioned range, this makes the calorific value larger, and the machine is ablated to a larger extent.

As well, it is advantageous that the heating temperature at which the drying method is performed by use of such a surfactant be 150° C. to 800° C. In a case where the heating temperature is lower than 150° C., it takes a longer time to perform the heat dry process. On the other hand, in a case where the heating temperature is higher than 800° C., the metal oxides are flocculated. Accordingly, each of the metal oxides has a tendency towards a decreased specific surface area. Furthermore, no specific restriction is imposed on the heating temperature. However, it is advantageous that the heating temperature be one to ten hours.

Moreover, in a case where such a drying method is adopted, it is advantageous that the homogeneously-dispersed solution, which has been mixed with the surfactant, be sprayed by use of an atomizer, that thereby aerosol droplets, which are uniform in size, be produced by use of a carrier gas such as nitrogen, and that thereafter the droplets be collected by means of causing the droplets to pass through a heater, and by use of collecting means such as a Teflon® filter. If do so, this tends to make it possible to more effectively obtain the porous composite metal oxide with better dispersiveness. Incidentally, no specific restriction is imposed on a rate of flow in this case.

As well, in the case of the present invention, a calcining step may be included after the drying step. It is advantageous that, in such a calcining step, the porous composite metal oxide be held at a temperature of approximately 400° C. to 1,000° C. for a time of one hour to 10 hours. If the calcining step is adopted, it tends to make it possible to inhibit the noble metal from being flocculated, which stems from decrease in the specific surface area of the carrier (borne body), after the durability test.

Furthermore, in the case of the present invention, it is advantageous that a bearing step be further included, the bearing step of causing a noble metal (noble metal particles) to be borne on each of the surfaces respectively of the first metal oxide particles and/or the second metal oxide particles. No specific restriction is imposed in the noble metal to be borne by each of the metal oxide particles in the bearing step. At least one kind of noble metal selected from a group consisting of Pt, Pd, Rh, Ru, Au, Ag, Os and Ir can be listed as the noble metal to be borne by each of the metal oxide particles. From the viewpoint of catalyst activity, it is advantageous that the noble metal to be borne by each of the metal oxide particles be Pt, Rh, Pd and Ir, out of the listed noble metals. It is particularly advantageous that the borne metal be Pt. Moreover, no specific restriction is imposed on the amount of the noble metal to be borne by each of the oxide metal particles. However, it is advantageous that 0.1 parts by mass to 10 parts by mass of the noble metal be relative to 100 parts by mass of the metal oxide particles which become the carriers. In a case where the amount of the noble metal is smaller than the aforementioned lower limit, catalyst activity to be brought about by the noble metal tends to be insufficient. On the other hand, in a case where the amount of the metal oxide particles exceeds the aforementioned upper limit, the catalyst activity to be brought by the noble metal tends to be saturated, and costs tend to be increased. Additionally, no specific restriction is imposed on how to cause the metal oxide particles to bear the noble metal. For example, a method is adopted whenever deemed necessary, according to which method the metal oxide particles are brought into contact with a solution of the noble metal salt, and a reduction treatment and/or a calcining treatment are applied to the metal oxide particles depending on the necessity. In addition, no specific restriction is imposed on the particle diameters of the noble metal particles to be borne. However, it is a general practice that the average diameter of the noble metal particles is 0.1 nm to 10 nm.

Moreover, in a case where the noble metal is borne in this manner, the metal oxide particles to bear the noble metal may be any one of the first metal oxide particles and the second metal oxide particles. Otherwise, the noble metal may be borne by the porous composite metal oxide to be finally obtained. In the case of the conventional porous composite metal oxide, however, the noble metal has to be borne by all of the metal oxides which constitute the porous composite metal oxide. On the other hand, in the case of the porous composite metal oxide to be produced by the producing method according to the present invention, the noble metal can be borne by only any one of the first metal oxide particles and the second metal oxide particles. As a consequence, in a case where the first metal oxide particles are used as a bear suitable for bearing the noble metal, or in a case where it is advantageous that the first metal oxide particles be caused to bear the noble metal, it is advantageous that the bearing step of this kind intervenes between the dispersing step and the dispersing-mixing step. If the bearing step intervenes between the dispersing step and the dispersing-mixing step, this makes it possible to cause only the first metal oxide particles to bear the noble metal. Accordingly, this tends to make it possible to improve the catalyst activity and the durability against high temperature of the porous composite metal oxide to be obtained. For example, in a case where ceria-zirconia composite oxide and alumina are used respectively as the first metal oxide and the second metal oxide, this tends to more improve the catalyst activity when the noble metal is on the surface of the ceria-zirconia composite oxide than when the noble metal is on the surface of the alumina. For this reason, it is advantageous that not less than 90% by mass of the noble metal be borne by the ceria-zirconia composite oxide. On the other hand, if the noble metal can be borne in high dispersion, the noble metal may be borne before the dispersing step.

Next, descriptions will be provided for the porous composite metal oxide according to the present invention. Specifically, the porous composite metal oxide according to the present invention is what is obtained by means of the method according to the present invention. The porous composite metal oxide according to the present invention is the consequence of flocculating the first metal oxide particles and the second metal oxide particles (additionally the noble metal particles in the case where the noble metal is borne) in a condition of being homogeneously dispersed at a nano level.

No specific restriction is imposed on the specific surface area of the porous composite metal oxide according to the present invention. However, it is advantageous that the specific surface area be 10 $m^2/g$ to 1,000 $m^2/g$. Incidentally, the specific surface area can be calculated, as a BET specific surface area, from the adsorption isotherm by use of the BET isothermal adsorption equation.

No specific restriction is imposed on the shape of the porous composite metal oxide according to the present invention, which has been described above. The porous composite metal oxide may be in the form of powder or a thin film. In addition, in a case where the porous composite metal oxide is in the form of powder, no specific restriction is imposed on the particle diameter. The particle diameter is controlled depending on the intended use whenever deemed necessary. Generally, it is advantageous that the particle diameter be approximately 50 μm to 200 μm. Furthermore, the porous composite metal oxide according to the present invention may be used by means of molding the porous composite metal oxide depending on the necessity. No matter what molding means is applicable. It is advantageous that an extrusion molding, a tablet molding, a tumbling granulation molding, a compression molding, CPI and the like be applied. The shape of the porous composite metal oxide can be determined depending on where and how the porous composite metal oxide is used. Columnar, crushed, spherical, honeycomb-shaped, convexo-concave, corrugated and the like can be listed as the shape of the porous composite metal oxide.

Moreover, no specific restriction is imposed on the intended use of the porous composite metal oxide according to the present invention, for example. The porous composite metal oxide can be used effectively as a catalyst for cleaning exhaust gas, a catalyst for cleaning VOC and the like, a reforming catalyst, a catalyst for cleaning the air, and the like. As well, no specific restriction is imposed on how the porous composite metal oxide according to the present invention. In a case where the porous composite metal oxide is used as the catalyst for cleaning exhaust gas, for example, the exhaust gas is cleaned of noxious components to be targeted for the process, by means of bringing the gas including the noxious components into the catalyst by use of a batch operation or in a continuous manner. $NO_x$, CO, HC, $SO_x$ and the like in the exhaust gas can be listed as the noxious components to be targeted for the process.

EXAMPLES

Next, detailed descriptions will be provided for the present invention on the basis of the examples and the comparative examples. However, the present invention is not limited to the following examples.

Example 1

Ceria-zirconium composite oxide (CZ) powder, which was an aggregate of the primary particles each with a diameter of approximately 8 nm, and which was 100 nm in average particle diameter, was dispersed in an aqueous solution at a pH of three, by use of zirconia microbeads each with a diameter of 50 μm, for 90 minutes. Thereby, CZ particles, which were 22 nm in average particle diameter, not less than 80% by mass of which were not larger than 43 nm in diameter (D80=43 nm), were obtained (in the dispersing step).

Subsequently, a nitric acid solution of Pt nitrate (the Pt concentration=4.5% by weight) was applied to the CZ particles thus obtained, and thereby the CZ particles were caused to bear Pt in the below-mentioned manner. Accordingly, the CZ particles bearing Pt (Pt/CZ particles) were obtained (in the bearing step). Specifically, the CZ particles were impregnated with, and were borne by, the Pt nitrate solution. Thus, the CZ particles were calcined at 300° C. for three hours. Incidentally, the amount of the Pt to be borne was one part by mass relative to 100 parts by mass of the CZ particles.

Then, the Pt/CZ particles thus obtained and alumina powder, which was an aggregate of primary particles each with a diameter of approximately 10 nm, and which was 162 nm in average diameter, were dispersed, and were mixed with each other, by use of zirconia microbeads each with a diameter of 50 μm, in an aqueous solution at a pH of 7, for 30 minutes (in the dispersing-mixing step). Thereafter, the homogeneously-dispersed solution thus obtained was frozen by use of liquid nitrogen. Then, the homogeneously-dispersed solution thus frozen was left in a vacuum container at room temperature (in the drying step). Thereby, catalyst powder made of the Pt/CZ particles and the alumina particles (120 nm in average particle diameter) was obtained. In this occasion, it is visually confirmed that there was no melting in the drying process. Subsequently, the catalyst powder thus obtained was compression-molded, and was crushed, into powder by meaning of pressing the catalyst powder by use of a metal mold (by a pressure of 1 t/cm$^2$). Accordingly, a pelletal catalyst, which was 0.5 mm to 1 mm in diameter, was obtained.

It should be noted that the mixing ratio (the mass ratio) between the Pt/CZ particles and the alumina particles in the dispersing-mixing step was 1:1, that the alumina particles to be obtained in the dispersing-mixing step were 110 nm in average particle diameter, and that not less than 80% by mass of the particles were not larger than 150 nm in diameter (D80=150 nm). In addition, the specific surface area of the catalyst thus obtained was as shown in Table 2.

Example 2

A catalyst was obtained in common with Example 1, except for by use of CZ particles shown in Table 1 which were obtained by means of performing the dispersing step for 120 minutes, and except for by use of alumina powder, which was an aggregate of primary particles each with a diameter of 10 nm, and which was 110 nm in average particle diameter. The specific surface area of the catalyst thus obtained was as shown in Table 2.

Example 3

A catalyst was obtained in common with Example 1, except for by use of CZ particles shown in Table 1 which were obtained by use of an aqueous solution at a pH of 5 in the dispersing step. The specific surface area of the catalyst thus obtained was as shown in Table 2.

Example 4

A catalyst was obtained in common with Example 1, except that the pH of the aqueous solution in the dispersing-mixing step was 4. The specific surface area of the catalyst thus obtained was as shown in Table 2.

Example 5

A catalyst was obtained in common with Example 1, except that the drying step was replaced with a heat dry process to be performed by use of the below-mentioned surfactant. Specifically, a nonionic surfactant (produced by Lion Corporation; its product name was LEOCON; and its substance name was polyoxyethylene-polyoxypropylen-mono-2-ethylhexyl ether) was added in a way that made the mass of the surfactant equal to that of the CZ particles; while the homogeneously-dispersed solution to be obtained in the dispersing-mixing step was being agitated by use of a propeller agitator. Subsequently, the dispersed solution thus obtained was agitated by use of a homogenizer/agitator (at an agitation speed of 200 sec$^{-1}$) at room temperature for 10 minutes at the same time as the dispersed solution thus obtained was agitated by use of the propeller agitator. Thereafter, the dispersed solution thus obtained was dried by heating at 400° C. for 5 hours. Hence, catalyst powder (120 nm in average particle diameter) made of the Pt/CZ particles and the alumina particles was obtained.

The specific surface area of the catalyst thus obtained was as shown in Table 2.

Example 6

A catalyst was obtained in common with Example 1, except that Pt was not borne by the CZ particles, and except that Pt was borne in the below-mentioned manner by the catalyst powder made of the CZ particles and the alumina particles to be obtained in the drying step. Specifically, the catalyst powder was impregnated with, and was borne by, the Pt nitrate solution (the Pt concentration=4.5% by weight). The catalyst powder was calcined at 300° C. for three hours. Incidentally, the amount of the Pt to be borne was 0.5 parts by mass relative to 100 parts by mass of the total of the CZ particles and the alumina particles. The specific surface area of the catalyst thus obtained was as shown in Table 2.

Example 7

First of all, the nitric acid solution of Pt nitrate (Pt concentration=4.5% by weight) was applied to the cerium-zirconium composite oxide (CZ) powder, which was an aggregate of the primary particles each with a diameter of approximately 8 nm, and which was 100 nm in average particle diameter. Thereby, the CZ particles were caused to bear Pt in the below-mentioned manner. Accordingly, the CZ powder bearing Pt (Pt/CZ powder) was obtained (in the bearing step). Specifically, the CZ powder was impregnated with, and was borne by, the Pt nitrate solution. Thus, the CZ powder was calcined at 300° C. for three hours. Incidentally, the amount of the Pt to be borne was one part by mass relative to 100 parts by mass of the CZ powder.

Then, the Pt/CZ powder thus obtained and alumina powder, which was an aggregate of primary particles each with a diameter of approximately 10 nm, and which was 110 nm in average particle diameter, were dispersed, and were mixed with each other, by use of zirconia microbeads each with a diameter of 50 μm, in an aqueous solution at a pH of 7, for 120 minutes (in the dispersing step and in the dispersing-mixing step separately: in a single dispersing step). Thereafter, while the homogeneously-dispersed solution thus obtained was being agitated by use of a propeller agitator, the nonionic surfactant (produced by Lion Corporation; its product name was LEOCON) was added in a way that made the mass of the surfactant equal to that of the CZ powder. Subsequently, the dispersed solution thus obtained was agitated by use of the homogenizer/agitator (at the agitation speed of 200 sec$^{-1}$) at room temperature for 10 minutes at the same time as the dispersed solution was agitated by use of the propeller agitator. Thereafter, the dispersed solution thus obtained was dried by heating at 400° C. for 5 hours. Hence, catalyst powder (120 nm in average particle diameter) made of the Pt/CZ particles and the alumina particles was obtained. Later, the catalyst powder thus obtained was compression-molded, and was crushed, into powder by meaning of pressing the catalyst powder by use of a metal mold (by a pressure of 1 t/cm$^2$). Accordingly, a pelletal catalyst, which was 0.5 mm to 1 mm in diameter, was obtained.

It should be noted that the mixing ratio (the mass ratio) between the Pt/CZ powder and the alumina powder in the aforementioned single dispersing step was 1:1, that the Pt/CZ particles to be obtained in the single dispersing step were 34 nm in average particle diameter, and that not less than 80% by mass of the particles were not larger than 41 nm in diameter (D80=41 nm). In addition, the alumina particles to be obtained in the single dispersing step were 87 in average particle diameter, and not less than 80% by mass of the particles were not larger than 112 nm in diameter (D80=112 nm). Furthermore, the specific surface area of the catalyst thus obtained was as shown in Table 4.

Example 8

A catalyst was obtained in common with Example 7, except that a time needed to perform the dispersing process in the aforementioned single dispersing step was 180 minutes. The specific surface area of the catalyst thus obtained was as shown in Table 4.

Example 9

A catalyst was obtained in common with Example 7, except that alumina powder, which was an aggregate of primary particles each with a diameter of approximately 10 nm, and which was 162 nm in average particle diameter, was used. The specific surface area of the catalyst thus obtained was as shown in Table 4.

Example 10

A catalyst was obtained in common with Example 7, except that the pH of the aqueous solution in the aforementioned single dispersing step was 5. The specific surface area of the catalyst thus obtained was as shown in Table 4.

Example 11

A catalyst was obtained in common with Example 7, except that the Pt was not borne by the CZ powder, and except that the Pt was borne in the below-mentioned manner by the catalyst powder made of the CZ particles and the alumina particles which are to be obtained in the drying step. Specifically, the catalyst powder was impregnated with, and was borne by, the Pt nitrate solution (the Pt concentration=4.5% by weight). The catalyst powder was calcined at 300° C. for three hours. Incidentally, the amount of the Pt to be borne was 0.5 parts by mass relative to 100 parts by mass of the total of the CZ particles and the alumina particles. The specific surface area of the catalyst thus obtained was as shown in Table 4.

Comparative Example 1

A catalyst was obtained in common with Example 1, except that the alumina powder, which was an aggregate of primary particles each with a diameter of approximately 10 nm, and which was 259 nm in average particle diameter, was used in the dispersing-mixing step. The specific surface area of the catalyst thus obtained was as shown in Table 2.

Comparative Example 2

A catalyst was obtained in common with Example 1, except that the CZ particles shown in Table 1 to be obtained by use of zirconia microbeads each with a diameter of 200 μm were used in the dispersing step, and except that the zirconia microbeads each with a diameter of 200 μm were used in the dispersing-mixing step. The specific surface area of the catalyst thus obtained was as shown in Table 2.

Comparative Example 3

A catalyst was obtained in common with Example 7, except that the alumina powder, which was an aggregate of primary particles each with a diameter of approximately 10 nm, and which was 259 nm in average particle diameter, was used in the aforementioned single dispersing step. The specific surface area of the catalyst thus obtained was as shown in Table 4.

Comparative Example 4

A catalyst was obtained in common with Example 7, except that the zirconia microbeads each with a diameter of 200 μm were used in the aforementioned single dispersing step. The specific surface area of the catalyst thus obtained was as shown in Table 4.

Comparative Example 5

A catalyst was obtained in common with Example 7, except that the alumina powder was not mixed. The specific surface area of the catalyst thus obtained was as shown in Table 4.

Comparative Example 6

A catalyst was obtained in common with Example 7, except that a ball mill using a zirconia pot with a cubic content of one liter and zirconia balls each with a diameter of 5 mm was used. The specific surface area of the catalyst thus obtained was shown in Table 4.

TABLE 1

| | FIRST METAL OXIDE (Pt/CZ)(FRESH) | | DISPERSING STEP | | | FIRST METAL OXIDE (AFTER DISPERSING STEP) | | SECOND METAL OXIDE (ALUMINA) (FRESH) | | DISPERSING·MIXING STEP | | | SECOND METAL OXIDE (AFTER DISPERSING·MIXING STEP) | |
|---|---|---|---|---|---|---|---|---|---|---|---|---|---|---|
| | PRIMARY PARTICLE DIAMETER (nm) | AVERAGE PARTICLE DIAMETER (nm) | DIAMETER OF MICROBEADS (μm) | pH | TIME NEEDED FOR DISPERSION (MINUTES) | AVERAGE PARTICLE DIAMETER (nm) | D80 (nm) | PRIMARY PARTICLE DIAMETER (nm) | AVERAGE PARTICLE DIAMETER (nm) | DIAMETER OF MICROBEADS (μm) | pH | TIME NEEDED FOR DISPERSION (MINUTES) | AVERAGE PARTICLE DIAMETER (nm) | D80 (nm) |
| EXAMPLE 1 | 8 | 100 | 50 | 3 | 90 | 22 | 43 | 10 | 162 | 50 | 7 | 30 | 110 | 150 |
| EXAMPLE 2 | 8 | 100 | 50 | 3 | 120 | 12 | 35 | 10 | 110 | 50 | 7 | 30 | 85 | 105 |
| EXAMPLE 3 | 8 | 100 | 50 | 5 | 90 | 42 | 71 | 10 | 162 | 50 | 7 | 30 | 110 | 150 |
| EXAMPLE 4 | 8 | 100 | 50 | 3 | 90 | 22 | 43 | 10 | 162 | 50 | 4 | 30 | 110 | 150 |
| EXAMPLE 5 | 8 | 100 | 50 | 3 | 90 | 22 | 43 | 10 | 162 | 50 | 7 | 30 | 110 | 150 |
| EXAMPLE 6 (POSTERIOR BEARING OF Pt) | 8 | 100 | 50 | 3 | 90 | 22 | 43 | 10 | 162 | 50 | 7 | 30 | 110 | 150 |
| COMPARATIVE EXAMPLE 1 | 8 | 100 | 50 | 3 | 90 | 22 | 43 | 10 | 259 | 50 | 7 | 30 | 240 | 255 |
| COMPARATIVE EXAMPLE 2 | 8 | 100 | 200 | 3 | 90 | 86 | 114 | 10 | 162 | 200 | 7 | 30 | 120 | 154 |

TABLE 2

| | SPECIFIC SURFACE AREA (m²/g) | | TEMPERATURE (° C.) FOR CLEANING FROM 50% OF HC | |
|---|---|---|---|---|
| | FRESH (700°) | AGED AT 1,000° C. | FRESH (700°) | AGED AT 1,000° C. |
| EXAMPLE 1 | 98 | 50 | 211 | 251 |
| EXAMPLE 2 | 111 | 53 | 208 | 246 |
| EXAMPLE 3 | 77 | 36 | 214 | 262 |
| EXAMPLE 4 | 89 | 40 | 212 | 262 |
| EXAMPLE 5 | 115 | 60 | 205 | 241 |
| EXAMPLE 6 | 95 | 47 | 215 | 260 |
| COMPARATIVE EXAMPLE 1 | 88 | 32 | 218 | 280 |
| COMPARATIVE EXAMPLE 2 | 71 | 30 | 214 | 282 |

TABLE 3

| | FIRST METAL OXIDE (Pt/CZ) (FRESH) | | SECOND METAL OXIDE (ALUMINA) (FRESH) | | | | | FIRST METAL OXIDE (AFTER SINGLE DISPERSING STEP) | | SECOND METAL OXIDE (AFTER SINGLE DISPERSING STEP) | |
|---|---|---|---|---|---|---|---|---|---|---|---|
| | PRIMARY PARTICLE DIAMETER (nm) | AVERAGE PARTICLE DIAMETER (nm) | PRIMARY PARTICLE DIAMETER (nm) | AVERAGE PARTICLE DIAMETER (nm) | DIAMETER OF MICROBEADS (μm) | pH | TIME NEEDED FOR DISPERSION (MINUTES) | AVERAGE PARTICLE DIAMETER (nm) | D80 (nm) | AVERAGE PARTICLE DIAMETER (nm) | D80 (nm) |
| EXAMPLE 7 | 8 | 100 | 10 | 110 | 50 | 7 | 120 | 34 | 41 | 87 | 112 |
| EXAMPLE 8 | 8 | 100 | 10 | 110 | 50 | 7 | 180 | 25 | 35 | 73 | 99 |
| EXAMPLE 9 | 8 | 100 | 10 | 162 | 50 | 7 | 120 | 37 | 49 | 114 | 148 |
| EXAMPLE 10 | 8 | 100 | 10 | 110 | 50 | 5 | 120 | 45 | 62 | 88 | 116 |
| EXAMPLE 11 (POSTERIOR BEARING OF Pt) | 8 | 100 | 10 | 110 | 50 | 7 | 120 | 35 | 42 | 86 | 110 |
| COMPARATIVE EXAMPLE 3 | 8 | 100 | 10 | 259 | 50 | 7 | 120 | 42 | 58 | 192 | 233 |

TABLE 3-continued

| | FIRST METAL OXIDE (Pt/CZ) (FRESH) | | SECOND METAL OXIDE (ALUMINA) (FRESH) | | | | | FIRST METAL OXIDE (AFTER SINGLE DISPERSING STEP) | | SECOND METAL OXIDE (AFTER SINGLE DISPERSING STEP) | |
|---|---|---|---|---|---|---|---|---|---|---|---|
| | PRIMARY PARTICLE DIAMETER (nm) | AVERAGE PARTICLE DIAMETER (nm) | PRIMARY PARTICLE DIAMETER (nm) | AVERAGE PARTICLE DIAMETER (nm) | DIAMETER OF MICROBEADS (μm) | pH | TIME NEEDED FOR DISPERSION (MINUTES) | AVERAGE PARTICLE DIAMETER (nm) | D80 (nm) | AVERAGE PARTICLE DIAMETER (nm) | D80 (nm) |
| COMPARATIVE EXAMPLE 4 | 8 | 100 | 10 | 110 | 200 | 7 | 120 | 63 | 84 | 141 | 174 |
| COMPARATIVE EXAMPLE 5 | 8 | 100 | — | — | 50 | 7 | 120 | 33 | 40 | — | — |
| COMPARATIVE EXAMPLE 6 | 8 | 100 | 10 | 110 | 5 mm (BALL MILL) | 7 | 120 | 86 | 97 | 92 | 113 |

TABLE 4

| | SPECIFIC SURFACE AREA (m²/g) | | TEMPERATURE (° C.) FOR CLEANING FROM 50% OF HC | |
|---|---|---|---|---|
| | FRESH (700°) | AGED AT 1,000° C. | FRESH (700°) | AGED AT 1,000° C. |
| EXAMPLE 7 | 96 | 41 | 208 | 251 |
| EXAMPLE 8 | 105 | 46 | 207 | 245 |
| EXAMPLE 9 | 88 | 36 | 210 | 256 |
| EXAMPLE 10 | 92 | 40 | 208 | 258 |
| EXAMPLE 11 | 98 | 43 | 222 | 257 |
| COMPARATIVE EXAMPLE 3 | 79 | 30 | 211 | 273 |
| COMPARATIVE EXAMPLE 4 | 82 | 31 | 215 | 279 |
| COMPARATIVE EXAMPLE 5 | 69 | 17 | 230 | 293 |
| COMPARATIVE EXAMPLE 6 | 94 | 20 | 214 | 288 |

<Test of Durability against High Temperature>

1.5 gram of the pelletal catalysts to be obtained in each of the aforementioned examples and comparative examples was held in an atmosphere to be obtained by flowing a rich gas and a lean gas, each of which had a composition shown in Table 5, alternately at intervals of 5 minutes in a way that caused the total throughput of the rich gas and the lean gas to be 330 ml/min, at 1,000° C. for 5 hours. Hence, the specific surface area of each pelletal catalyst was measured after the test of durability. The results thus obtained are shown in Tables 2 and 4.

TABLE 5

| | CO | $H_2$ | $CO_2$ | $O_2$ | $C_3H_6$ | $H_2O$ | $N_2$ |
|---|---|---|---|---|---|---|---|
| RICH | 0.1 | 5 | 10 | 0.2 | 0.24 (% C) | 5 | balance |
| LEAN | 0.1 | 0 | 10 | 5.2 | 0.24 (% C) | 5 | balance |

<Test of Evaluation of Catalytic Activity>

By use of a normal-pressure fixed-bed flow reactor, a rich gas and a lean gas, each of which had a composition shown in Table 6, were flown to one gram of each of the pelletal catalysts (fresh ones) to be obtained in the examples and the comparative examples and one gram of each of the pelletal catalysts (aged ones) to which the test of durability against high temperature was applied, at intervals of one second in a way that caused the total amount of the rich gas and the lean gas to be 7 L/min. Then, the rates of cleaning the gases of HC were measured at each temperature in a range of 100° C. to 500° C. as the temperature of the gases thus inputted. Thereby, temperatures at which the gases were cleaned of 50% of the HC were found. The obtained results are shown in Tables 2 and 4.

TABLE 6

| | CO | $H_2$ | $CO_2$ | $O_2$ | NO | $C_3H_6$ | $H_2O$ | $N_2$ |
|---|---|---|---|---|---|---|---|---|
| RICH | 1.82 | 0.606 | 10 | 0.646 | 0.12 | 0.16 (% C) | 5 | balance |
| LEAN | 0.70 | 0.233 | 10 | 1.394 | 0.12 | 0.16 (% C) | 5 | balance |

As was clear from the results shown in Tables 2 and 4, in the cases of the catalysts (Examples 1 to 11) made of the porous composite metal oxide according to the present invention to be obtained through the method according to the present invention, the specific surface areas and cleaning performances of the respective catalysts were maintained at a high level even after a high-temperature durability test, and the durability of each of the catalysts against the high temperature was extremely good. Among those catalysts, the catalysts (Examples 1, 2 and 5) to be made of the porous composite metal oxide to be obtained by adjusting the pH of each of the dispersion mediums in the dispersing step and the dispersing-mixing step to the advantageous range were extremely good at durability against the high temperature. The catalyst (Example 5) to be made of the porous composite metal oxide to be obtained by applying the heat dry process thereto by use of the surfactant was better at durability against the high temperature.

INDUSTRIAL APPLICABILITY

As described above, the present invention makes it possible to obtain the porous composite metal oxide, which is extremely good at durability against the high temperature, and which maintains the specific surface area and the cleaning performance at the high level even after a high-temperature durability test. As a consequence, the present invention is extremely useful as the porous composite metal oxide, which is good at durability against the high temperature, and which is useful as a catalyst for cleaning exhaust gas and the like. As well, the present invention is useful as the method of producing the porous composite metal oxide.

What is claimed is:

1. A method of producing a porous composite metal oxide comprising the steps of:
   dispersing first metal oxide powder, which is an aggregate of primary particles each with a diameter of not larger than 50 nm, in a dispersion medium using microbeads each with a diameter of not larger than 150 µm, thus forming first metal oxide particles having an average particle diameter of 1 nm to 50 nm, wherein 80% or more by mass of said first metal oxide particles are 75 nm or smaller in diameter;
   dispersing and mixing in a dispersion medium said first metal oxide particles and a second metal oxide powder, said second metal oxide powder being an aggregate of primary particles each with a diameter of not larger than 50 nm, and not larger than 200 nm in average particle diameter, thus forming a homogeneously-dispersed solution of the first metal oxide particles and second metal oxide particles; and
   drying the homogeneously-dispersed solution, thus obtaining a porous composite metal oxide.

2. The method of producing a porous composite metal oxide according to claim 1,
   wherein the first metal oxide is an oxygen storage material made of a metal oxide having an oxygen storage capacity, and
   wherein the second metal oxide is a diffusion barrier material made of a metal oxide which becomes a diffusion barrier.

3. The method of producing a porous composite metal oxide according to claim 1,
   wherein the pH of the dispersion medium in the dispersing step is a pH in a range which makes the zeta potential of the first metal oxide not smaller than 20 mV in absolute value, and
   wherein the pH of the dispersion medium in the dispersing-mixing step is a pH in a range which causes one of the zeta potential of the first metal oxide and the zeta potential of the second metal oxide to be a positive potential, and which causes the other to be a negative potential.

4. The method of producing a porous composite metal oxide according to claim 1,
   wherein the second metal oxide particles are 1 nm to 130 nm in average particle diameter, wherein 80% or more by mass of the particles are 160 nm or smaller in diameter.

5. The method of producing a porous composite metal oxide according to claim 1, wherein the first metal oxide particles and the second metal oxide powder are dispersed, and are mixed with each other, in the dispersing medium using microbeads each with a diameter of not larger than 150 µm in the dispersing-mixing step.

6. The method of producing a porous composite metal oxide according to claim 1, wherein the dispersing step and the dispersing-mixing step are performed using microbeads each with a diameter of not larger than 150 µm in a single step.

7. The method of producing a porous composite metal oxide according to claim 1, further comprising the step of causing a noble metal to be borne on the surface of each of particles of at least one of the first metal oxide particles and the second metal oxide particles.

8. The method of producing a porous composite metal oxide according to claim 1, wherein a surfactant is added to, and is mixed with, the homogeneously-dispersed solution, thereafter heat-drying the homogeneously-dispersed solution mixed with the surfactant in the drying step.

9. The method of producing a porous composite metal oxide according to claim 1, wherein the porous composite metal oxide is a catalyst for cleaning exhaust gas.

10. The method of producing a porous composite metal oxide of claim 1, wherein said first metal oxide is selected from the group consisting of oxides comprising Y, La, Ce, Pr, Nd, Eu, Gd, Tb, Dy, Ho, Er, Tm, Yb, Lu, Ca, Mg, Al, K, Ti, Cr, Mn, Fe, Co, Ni, Cu, Ga, Rb, Sr, Zr, Nb, Mo, In, Sn, Cs, Ba, Ta, W, Pt, Pd, Rh, Ru, Au, Ag, Os, Ir, Si, Ge, As, and Sb.

11. The method of producing a porous composite metal oxide of claim 1, wherein said second metal oxide is selected from the group consisting of oxides comprising Y, La, Ce, Pr, Nd, Eu, Gd, Tb, Dy, Ho, Er, Tm, Yb, Lu, Ca, Mg, Al, K, Ti, Cr, Mn, Fe, Co, Ni, Cu, Ga, Rb, Sr, Zr, Nb, Mo, In, Sn, Cs, Ba, Ta, W, Pt, Pd, Rh, Ru, Au, Ag, Os, Ir, Si, Ge, As, and Sb.

12. The method of producing a porous composite metal oxide of claim 1, wherein said first metal oxide is a single oxide or a composite oxide comprising at least one metal selected from a group consisting of Ce, Zr, Al, Ti, Si, Mg, Fe, Mn, Ni, Zn and Cu.

13. The method of producing a porous composite metal oxide of claim 1, wherein said second metal oxide is a single oxide or a composite oxide comprising at least one metal selected from a group consisting of Ce, Zr, Al, Ti, Si, Mg, Fe, Mn, Ni, Zn and Cu.

14. The method of producing a porous composite metal oxide of claim 1, wherein said first metal oxide is a selected from a group consisting of ceria, zirconia, ceria-zirconia composite oxide, alumina, titania, sepiolite and zeolite.

15. The method of producing a porous composite metal oxide of claim 1, wherein said second metal oxide is a selected from a group consisting of ceria, zirconia, ceria-zirconia composite oxide, alumina, titania, sepiolite and zeolite.

16. A porous composite metal oxide produced by the method according to claim 1.

* * * * *